E. F. W. ALEXANDERSON.
ALTERNATING CURRENT HIGH FREQUENCY GENERATOR.
APPLICATION FILED FEB. 6, 1905.
905,621.
Patented Dec. 1, 1908.
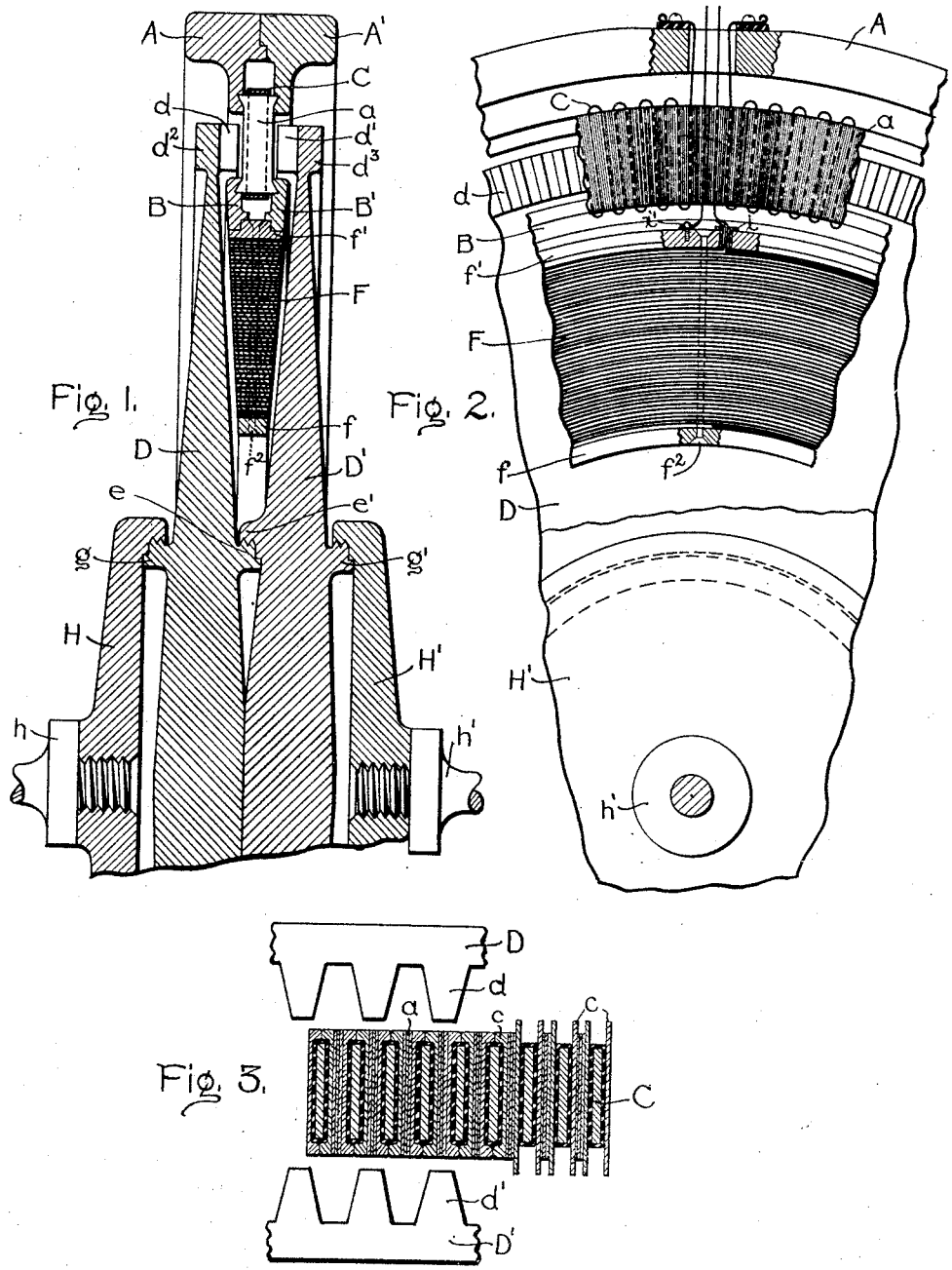
Witnesses.
Ehrathan E Briggs
Helen Oxford
Inventor:
Ernst F. W. Alexanderson
by Albert G Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT HIGH-FREQUENCY GENERATOR.

No. 905,621.  Specification of Letters Patent.  Patented Dec. 1, 1908.

Application filed February 6, 1905. Serial No. 244,298.

*To all whom it may concern:*

Be it known that I, ERNST F. W. ALEXANDERSON, a subject of the King of Sweden, residing at Schenectady, county of Schenectady, State of New York, have invented certain new and useful Improvements in Alternating-Current High-Frequency Generators, of which the following is a specification.

My invention relates to dynamo-electric machines for producing alternating-current of high frequency, and its object is to produce a commercially operative machine capable of generating directly currents of extremely high frequency, such as from 50,000 to 100,000 cycles per second. In order to obtain such enormous frequency by magnetic induction, two things are obviously necessary; the distance between poles must be extremely small, and the relative movement of the poles and armature conductors must be extremely high. My invention contemplates the use of a machine of the inductor type.

One feature of my invention consists in a novel arrangement of the moving part or inductor of the machine, which consists simply of two disks tapered toward the periphery, so as to give the maximum factor of safety against centrifugal strains, and in so connecting the disks to each other and to the supporting shaft that the strength of the disks is not diminished for resisting bursting strains. Furthermore, the arrangement employed allows a certain flexibility which permits moving parts to adjust themselves with respect to their center of gravity when high speed is attained.

In machines adapted for very high frequency, it is out of the question to employ large laminated iron armature bodies, as in the ordinary low frequency machine, since the hysteresis and eddy current losses become enormous at high frequencies. It has, consequently, been attempted heretofore to dispense with iron altogether, but the extremely small pole-pitch, which is necessarily employed in high frequency machines, results in a distribution of magnetic flux, when iron is omitted from the armature, which is substantially uniform throughout the field, so that little, if any, electromotive force can be generated. By my invention I reduce the amount of iron in that part of the armature body, which is traversed by the field flux, to a minimum, while retaining sufficient iron to prevent a substantially uniform distribution of the flux, as is obtained when iron is entirely omitted.

Another feature of my invention relates to a novel means which I employ for avoiding leakage fluxes, and thereby increasing the efficiency of the machine. Since the frequency factor of the armature reactance in high frequency machines is very high, it is essential that the inductance factor should be kept at its lowest possible value, in order that the reactance may not become excessive. The inductance factor is directly affected by the leakage flux,—that is the greater the amount of flux which leaks across the space, occupied by the armature conductor, between adjacent sections of armature laminations, the greater is the inductance of the conductor. Furthermore, this leakage flux produces eddy currents in the armature conductor, which result in forcing the armature currents to the outer edges of the conductor, so that the apparent resistance of the conductor is increased. By reducing this leakage flux, both the inductance and apparent resistance of the armature are decreased, and the efficiency of the machine is thereby improved.

One feature of my invention consists in providing novel means for accomplishing the ends set forth above, consisting in providing a closed circuit of high conductivity arranged to be threaded by the flux passing transversely across the space occupied by the armature conductors, or in other words, arranged in inductive relation to the leakage flux and acting as a screen therefor. More specifically stated this feature of my invention consists in inserting a layer of conducting material between the armature conductor and the iron laminations, which acts as a screen for the leakage flux.

Other features of my invention will appear from the following specification, and will be more specifically pointed out in the appended claims.

My invention will best be understood by reference to the accompanying drawings, in which—

Figure 1 shows a sectional side elevation of the upper half of a high frequency generator constructed in accordance with my invention; Fig. 2 shows an end elevation of a portion of the same, a part of one of the revolving disks being broken away; and Fig. 3 shows an enlarged detail view of the active portion of the armature, and the revolving magnetic poles.

In the drawings, the armature frame is shown as composed of two rings A A' between which are clamped the armature laminations $a$. These laminations are arranged radially in the form of a ring, and threaded radially through this ring in a zig-zag manner, as is clearly shown in Fig. 2, is the armature conductor C. The inner ends of the laminations $a$ are clamped between two rings B B'.

F represents the field coil which is preferably formed of a flat strip wound upon the inner supporting ring $f$, and clamped between the inner ring and an outer ring $f^1$ by means of the rivets $f^2$. The outer ring $f^1$ is clamped between the rings B B', which also engage the inner ends of the armature laminations.

The revolving portion of the magnet circuit of the machine consists of an inductor comprising two steel disks D D', which are tapered, as shown, in order to afford the maximum of safety against centrifugal strength, and which carry on the inner sides of their peripheries the poles $d$ $d'$, respectively. The weight of these poles is balanced by rings or flanges $d^2$ $d^3$ on the outer side of the peripheries of the disks. The strength of such a disk as is shown in Fig. 1 is very greatly weakened by even a small hole drilled through it, so that in the construction of the machine, all bolt-holes, and even a bore for the supporting shaft, are carefully avoided. The two disks D D' are secured to each other by means of the two flanges $e$ and $e'$, which are carried on the inner sides of their respective disks. The flange $e$ is provided with an external screw-thread, as shown, while the flange $e'$ is provided with an internal screw-thread. By means of this arrangement, the two disks may be forced into contact with each other at their centers, so as to form with the armature laminations $a$ a nearly closed magnetic circuit of comparatively high efficiency. The only portion of the magnetic circuit in which the flux varies, is the ring formed by the armature laminations, and the length of this portion of the circuit and consequently the eddy current and hysteresis losses are reduced to a minimum.

The disks are connected to the supporting shaft by a structure similar to that which binds them together. Each disk carries an external flange $g$ $g'$, which is provided with external screw-threads adapted to be engaged by internal screw-threads on flanges at the peripheries of the caps H H'. These caps or end-plates may be secured to opposite ends of the sections of the supporting shaft $h$ $h'$ by screw-threads or any other suitable connection. It will be seen that this construction avoids the use of all holes whatever within the bodies of the disks D D', and permits a certain amount of flexibility to be obtained, so as to allow the inductor to rotate around its own center of gravity when running at high speed. This action is aided by the small size of the shafts $h$ $h'$.

By referring to Fig. 3, it will be seen that with a pole-pitch small as compared with the distance between opposite poles, a substantially uniform distribution of the flux would be produced in the space between opposite poles, if no iron were employed in the armature body; but on the other hand, if iron or steel laminations are employed, as indicated at $a$, and if the air-gap between the armature laminations and the revolving poles is made small, it is clear that a much greater flux will pass through the laminations which at any instant are directly opposite a pair of poles, than will pass through the set of laminations on either side midway between two pairs of poles. Consequently, the proportion of total flux, which is useful in generating an electromotive force in the armature, is greatly increased by employing iron or steel laminations.

In order to reduce to a minimum the leakage fluxes passing transversely through the space occupied by the armature conductor between adjacent sets of laminations, I employ the arrangement that is clearly shown in Fig. 3. $c$ $c$ represent laminæ of non-magnetic, highly conducting, material, such as silver, which are placed between the armature conductor C and the magnetic laminæ $a$. These conducting laminæ are preferably made of greater width than the magnetic laminæ, as is indicated at the right-hand of Fig. 3, and then are hammered over flush with the outer edges of the laminæ $a$, so as to form a conductor of appreciable cross-section at each outer edge of each turn of the armature conductor C. The laminæ $c$ consequently form short-circuited conductors of very low resistance, lying across the path of the leakage flux which tends to pass transversely from one set of magnetic laminæ to the other, and act as effective screens for the flux; thereby decreasing the inductance and apparent resistance of the armature, and increasing the efficiency of the machine.

It will be seen from Fig. 1 that the field coil F is practically surrounded by the rotary disks of the inductor. In order to make the necessary connections to the field winding, I make use of the construction shown in Fig. 2. The end of the inside turn of the field coil F is uninsulated from the inner supporting ring $f$, and is pressed into contact therewith both by the other turns of the field-spool, and also by the clamping rivet $f^2$. These rivets, which are insulated from the turns of the field coil, form an electrical connection between inner ring $f$ and the outer ring $f^1$, which is insulated from the outer turn of the field coil $f$. This outer turn is led through an insulating bushing in the outer ring $f^1$, so as to form one terminal of the field winding, as indicated at $i$. The other terminal $i^1$ may be formed by a screw or binding-post secured to the ring $f^1$. The leads from these terminals are brought to the outer part of the machine by extending them through the laminations $a$ in place of two turns of the continuous conductor C, which turns are omitted from the armature winding. By this arrangement, the ring formed by the laminations $a$ is unbroken, so that the reluctance between any two opposite poles $d\ d'$ on the revolving disks is equal, thereby avoiding any magnetic fluctuations and resulting eddy currents in the disks themselves.

It is obvious that my invention comprises a number of features which, while I prefer to use them together, may, with advantage, be used separately, and which I desire to claim whether used together or not. Accordingly, I do not desire to limit myself to the particular construction and arrangement of parts here shown, but aim in the appended claims to cover all modifications which are within the scope of my invention.

What I claim as new, and desire to secure by Letters Patent of the United States, is,—

1. In a dynamo-electric machine, two rotatably mounted disks of magnetic material tapering toward their centers, polar projections or teeth on the inner sides of the peripheries of said disks, a flange on the outer sides of the peripheries of said disks counterbalancing said polar projections, a stationary coil adapted to magnetize said disks, and a conductor disposed between said polar projections.

2. In a dynamo-electric machine, two rotatably mounted disks of magnetic material magnetically united at their centers, polar projections on the inner sides of the peripheries of said disks, means for magnetizing said disks, a stationary ring of radially arranged laminæ of magnetic material disposed between said polar projections, and a continuous conductor threaded radially back and forth through said ring.

3. In a dynamo-electric machine, two rotatably mounted disks of magnetic material tapering toward their peripheries and bound together near their centers, polar projections or teeth on the inner sides of the peripheries of said disks, a stationary ring of radially arranged laminæ of magnetic material disposed between said polar projections, a continuous conductor threaded radially back and forth through said ring, and a stationary magnet coil concentric with said disks and disposed between said disks and within said ring.

4. In a dynamo-electric machine, two rotatably mounted disks of magnetic material magnetically united at their centers, polar projections on the inner sides of the peripheries of said disks, a stationary ring of radially arranged laminæ of magnetic material disposed between said polar projections, a continuous conductor threaded radially back and forth through said ring, a stationary magnet coil supported between said disks and within said ring, and terminal leads extending from said magnet outwardly through said ring.

5. In a dynamo-electric machine, a stationary frame, a ring of radially arranged magnetic laminæ supported in said frame, a continuous conductor threaded radially back and forth through said ring, a magnet coil supported within said ring, two rotatably mounted disks of magnetic material on opposite sides of said coil magnetically united at their centers, and polar projections or teeth on the inner sides of the peripheries of said disks extending into close proximity to said ring.

6. In a dynamo-electric machine, a stationary frame, a ring of radially arranged magnetic laminæ supported in said frame, a continuous conductor threaded radially back and forth through said ring, a magnet coil supported within said ring, two rotatably mounted disks of magnetic material on opposite sides of said coil magnetically united at their centers, polar projections or teeth on the inner sides of the peripheries of said disks extending into close proximity to said ring, and terminal leads from said field coil extending outwardly through said ring.

7. In a dynamo-electric machine, an inductor comprising two disks of magnetic material bound together at their centers and tapering toward their peripheries, and polar projections or teeth on the inner sides of the peripheries of said disks, and flanges on the outer sides of the peripheries counter-balancing said polar projections.

8. In a dynamo-electric machine, an inductor comprising two parallel disks of magnetic material tapering towards their peripheries and provided at their peripheries with polar projections or teeth, one of said disks being provided near its center with an externally threaded flange and the other disk being provided with an internally threaded flange adapted to receive the flange on the first disk, whereby said disks are bound together near their centers.

9. In a dynamo-electric machine, an inductor comprising two parallel disks of magnetic material tapering towards their peripheries and provided at their peripheries with polar projections or teeth, said disks being provided near their centers with inwardly extending flanges and means for binding said flanges together.

10. In a dynamo-electric machine, an inductor comprising two parallel disks of magnetic material tapering towards their peripheries and provided at their peripheries with polar projections or teeth, said disks being provided near their centers with inwardly extending flanges, and means for binding said flanges together, and with outwardly extending flanges and means for binding each flange to a rotatable shaft.

11. In a dynamo-electric machine, an inductor comprising two parallel disks of magnetic material tapering towards their peripheries and provided at their peripheries with polar projections or teeth, said disks being provided near their centers with flanges on both inner and outer sides, the inner flanges being adapted to screw into each other to bind the disks together, and rotatably mounted members outside said disks adapted to screw into said outer flanges to support said disks rotatably.

12. In an alternating current generator for high frequencies, an armature body comprising magnetic laminæ, an armature conductor arranged between said laminæ, and non-magnetic laminæ of high conductivity inserted between said conductor and said magnetic laminæ.

13. In an alternating current generator for high frequencies, an armature body comprising magnetic laminæ, an armature conductor arranged between said laminæ, and non-magnetic laminæ of high conductivity inserted on each side of the conductor, said non-magnetic laminæ being of greater width than the magnetic laminæ and having their edges folded over the edges of said conductor.

14. In a dynamo-electric machine, two rotatably mounted disks of magnetic material magnetically joined at their centers and provided with polar projections or teeth on the inner sides of their peripheries, means for magnetizing said disks, a ring of radially arranged magnetic laminæ, disposed between said polar projections, a conductor threaded radially back and forth through said ring, and non-magnetic laminæ of high conductivity inserted between said conductor and said magnetic laminæ.

15. In a dynamo-electric machine, an armature comprising a conductor, magnetic material on opposite sides of said conductor, and metal sheets of high conductivity inserted between said conductor and said magnetic material and insulated from said conductor.

16. In a dynamo-electric machine, an armature comprising a conductor, magnetic material on opposite sides of the conductor, and a closed conducting circuit arranged to be threaded by the flux passing transversely between the portions of magnetic material on opposite sides of said conductor.

In witness whereof I have hereunto set my hand this 4th day of February, 1905.

ERNST F. W. ALEXANDERSON.

Witnesses:
BENJAMIN B. HULL,
HELEN ORFORD.